United States Patent
Bicking

(10) Patent No.: US 7,112,957 B2
(45) Date of Patent: Sep. 26, 2006

(54) GMR SENSOR WITH FLUX CONCENTRATORS

(75) Inventor: Robert E. Bicking, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 12 days.

(21) Appl. No.: 10/869,741

(22) Filed: Jun. 16, 2004

(65) Prior Publication Data

US 2005/0280411 A1  Dec. 22, 2005

(51) Int. Cl.
- G01B 7/30 (2006.01)
- G01B 7/14 (2006.01)
- G01R 33/02 (2006.01)
- G01R 33/09 (2006.01)

(52) U.S. Cl. ............. 324/207.25; 324/244; 324/207.21
(58) Field of Classification Search ........... 324/207.25, 324/207.21, 244
See application file for complete search history.

(56) References Cited

U.S. PATENT DOCUMENTS

| | | | |
|---|---|---|---|
| 4,857,837 A | 8/1989 | Baran et al. | |
| 5,351,028 A | 9/1994 | Krahn | |
| 5,500,589 A | 3/1996 | Sumcad | |
| 5,732,016 A | 3/1998 | Chen et al. | |
| 5,883,567 A | 3/1999 | Mullins | |
| 6,150,809 A | 11/2000 | Tiernan et al. | |
| 6,384,600 B1 * | 5/2002 | Coehoorn | 324/252 |
| 6,465,053 B1 | 10/2002 | Lenssen et al. | |
| 6,501,268 B1 | 12/2002 | Edelstein et al. | |
| 2001/0013776 A1 | 8/2001 | Coehoorn et al. | |
| 2002/0180433 A1 | 12/2002 | Van Zon et al. | |
| 2003/0222642 A1 * | 12/2003 | Butzmann | 324/207.21 |
| 2003/0231098 A1 | 12/2003 | Wan | |

OTHER PUBLICATIONS

"High-Resolution, Chip-Size Magnetic Sensor Arrays," http://www.sensorsmag.com/articles/0303/44/main.shtml, Sensor Technology and Design, 7 pages, Mar. 2003.
"Utilization of GMR Materials," http://www.nve.com/technical/explinations/Bridge.php, 3 pages, printed Feb. 9, 2004.
"GMR Sensor Application Notes," NVE Sensor Engineering and Application Notes, pp. 1-44, Sep. 10, 1998.
Caruso et al., "A New Perspective on Magnetic Field Sensing," Honeywell Inc., pp. 1-19, May 1998.

* cited by examiner

Primary Examiner—Bot LeDynh
(74) Attorney, Agent, or Firm—Brian N. Tufte

(57) ABSTRACT

A proximity sensor that is capable of producing a relatively larger output signal than past proximity sensors, and in some cases, an output signal that is relatively independent of the speed at which a target passes the sensor. In one illustrative embodiment, the proximity sensor includes a first magnetoresistive resistor and a second magnetoresistive resistor connected in a bridge configuration. The first magnetoresistive resistor is spaced from the second magnetoresistive resistor along the path of a moving ferrous target. A bias magnet source is positioned behind the proximity sensor, and the ferrous target passes in front of the proximity sensor. The ferrous target alters the direction of the bias magnetic field in the vicinity of the first and second magnetoresistive resistors as the ferrous target passes by the proximity sensor. Flux concentrators are positioned proximate to each of the first and second magnetoresistive resistors. The flux concentrators may help redirect or shunt the magnetic field component produced by the bias magnet source that is perpendicular to the direction of motion of the target through the first and second magnetoresistive resistors in a direction that is parallel to the direction of motion of the target.

43 Claims, 5 Drawing Sheets

GMR SENSOR WITH FLUX CONCENTRATORS

BACKGROUND OF THE INVENTION

The present invention relates generally to proximity sensors and more particularly to proximity sensors that sense changes in a magnetic field in the plane of the sensing element.

There has been, and continues to be, a need to do better magnetic detection of the location or proximity of a ferromagnetic object relative to a magnetic sensor. The need exists in a variety of commercial, industrial and automotive applications. For example, in some applications, there is a need to do better magnetic detection of the location or proximity of a passing gear tooth moving near the end of a probe type sensor. This is only one specific application, and there are numerous other applications that have a need detect the location or proximity of a ferromagnetic object relative to a magnetic sensor.

A number of proximity sensing devices based on magnetic sensing have been utilized in the past. Variable reluctance sensors (VRS) have been used in which the motion of gear teeth causes the net flux change in the magnetic field provided by a permanent magnet creates a voltage in a coil wrapped around the magnet. However, for lower gear teeth speeds, the voltage generated is often small and difficult to detect above the ambient noise.

Hall type magnetic sensors which include a permanent magnet and a Hall effect type transducer have also been used in gear teeth sensing applications. When a gear tooth is not near the transducer face, a fixed level of magnetic field is detected by the transducer. When a tooth is moved into proximity to the sensor, the tooth acts as a flux concentrator to increase the field detected. However, this increase in the detected field relative to the fixed level is often small, which can result in a relatively small output signal and a relatively poor signal to noise ratio.

A need exists for a proximity sensor which is capable of producing a relatively larger output signal than past proximity sensors. A need also exists for a proximity sensor that can produce an output signal that is relatively independent of the frequency at which, for example, gear teeth or the like pass the sensor.

SUMMARY OF THE INVENTION

The present invention generally relates to a proximity sensor that produces a relatively larger output signal than past proximity sensors, and in some cases, an output signal that independent or at least relatively independent of the speed at which a target passes the sensor. In one illustrative embodiment, the proximity sensor includes a first magnetoresistive resistor and a second magnetoresistive resistor connected in a bridge configuration. The first magnetoresistive resistor is spaced from the second magnetoresistive resistor along the path of a moving ferrous target. A bias magnet source is positioned behind the proximity sensor, and the ferrous target passes in front of the proximity sensor. The ferrous target alters the direction of the bias magnetic field in the vicinity of the first and second magnetoresistive resistors as the ferrous target passes by the proximity sensor.

In some embodiments, the first and second magnetoresistive resistors are Giant Magneto Resistive (GMR) resistors, and may only be sensitive to the bias magnetic field component that is in the plane of the proximity sensor. In some embodiments, flux concentrators may be positioned proximate to each of the first and second magnetoresistive resistors. The flux concentrators may help redirect or shunt the magnetic field component produced by the bias magnet source that is perpendicular to the direction of motion of the target through the first and second magnetoresistive resistors in a direction that is parallel to the direction of motion of the target. This may help improve the sensitivity and increase the dynamic range of the proximity sensor, and may further help minimize the effect of any misalignment between the biasing magnetic and the proximity sensor, and between the proximity sensor and the ferrous target. In some cases, four or more resistors are used, and may be connected in a full bridge configuration.

BRIEF DESCRIPTION OF THE DRAWINGS

The invention may be more completely understood in consideration of the following detailed description of various embodiments of the invention in connection with the accompanying drawings, in which.

Figure 1:
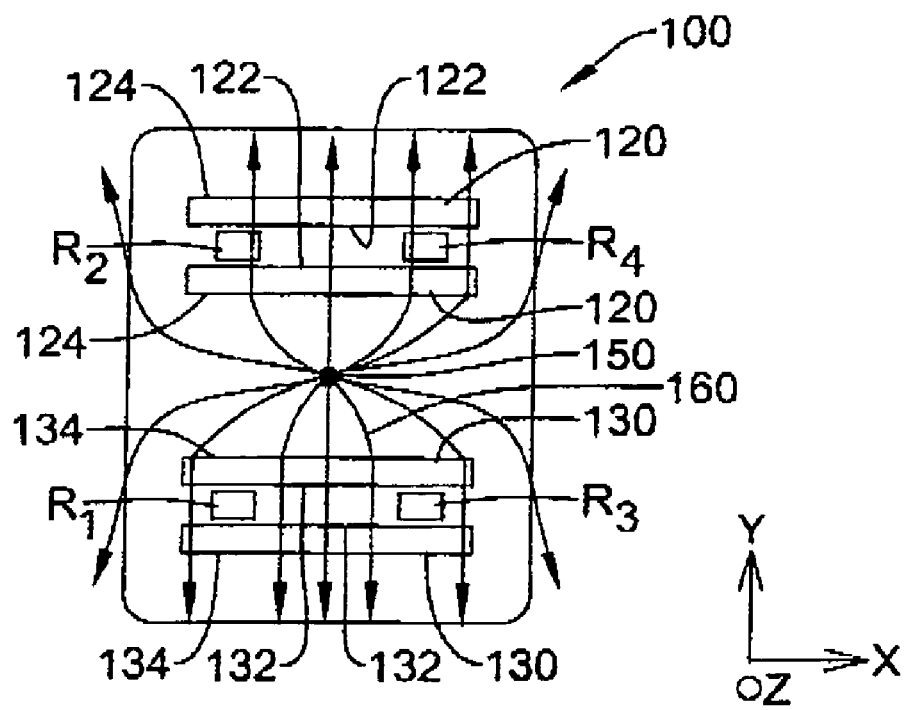
FIG. 1 is a schematic plan view of a physical layout of a proximity sensor.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

The present invention provides a proximity sensor. In some embodiments, the invention uses magnetoresistive resistor made from a Giant Magneto-Resistive (GMR) material that are configured in a sensing bridge. In some cases, the GMR sensing bridge may be configured to minimize sensitivity in a standard axis. In other cases, the GMR sensing bridge may be configured to minimize sensitivity in a cross-axis axis. While the present invention is not so limited, an appreciation of various aspects of the invention will be gained through a discussion of the various illustrative embodiments and examples provided below.

FIG. 1 is a schematic plan view of a physical layout of a magnetoresistive proximity sensor 100. In the illustrative embodiment, the proximity sensor 100 is configured as a full Wheatstone bridge (see, for example, FIG. 2), but in other embodiments, a half Wheatstone bridge or other configuration may be used, as desired.

The illustrative proximity sensor 100 of FIG. 1 includes a first pair of magnetoresistive resistors $R_1$, $R_3$, and a second pair of magnetoresistive resistors $R_2$, $R_4$. In the illustrative embodiment, the first pair of magnetoresistive resistors $R_1$, $R_3$ and the second pair of magnetoresistive resistors $R_2$, $R_4$ are electrically connected in a full Wheatstone bridge configuration. A first flux concentrator 130 is positioned proximate the first pair of magnetoresistive resistors $R_1$, $R_3$, and a second flux concentrator 120 is positioned proximate the second pair of magnetoresistive resistors $R_2$, $R_4$.

The first pair $R_1$, $R_3$ and second pair $R_2$, $R_4$ of magnetoresistive resistors can be sensitive in two axes in the plane of the resistor films, such as in the X axis and the Y axis as shown. The resistor films can include a Giant Magneto Resistance (GMR) material or material system. Each GMR resistor has an in-plane standard axis and an in-plane cross-axis direction. Referring specifically to FIG. 1, and in the illustrative embodiment, the in-plane standard axis is parallel to the X axis and the in-plane cross-axis is parallel to the Y axis.

Giant Magneto Resistance (GMR) is an effect typically characterized by relatively larger changes in resistance of certain types of materials in response to the presence of a magnetic field. With GMR, there is a so-called "giant" change in resistance ($\Delta R/R$) response that is markedly greater in magnitude than that obtained by ordinary anisotropic magneto resistance (AMR) materials. Generally, materials and components observed to exhibit giant magneto resistance often include multiple layers of thin (roughly 20 Angstrom, but can be more or less) ferromagnetic films alternated with similarly thin layers of non-magnetic conducting films, typically copper, cobalt, nickel, iron and/or other metals. There have also been reports of GMR materials made using powders as starting materials.

In general, GMR films are in a higher resistance state when the magnetization in the GMR multilayer is predominantly anti-parallel in adjacent magnetic layers, and can be then brought to a lower resistance state by the action of an applied field which rotates the layers' magnetization into a predominantly parallel orientation—roughly along the applied field direction. Consequently, GMR sensors often generate a signal, based on a change in resistance, in response to a change in an external applied magnetic field. The resistance of a typical GMR resistor can change by 10% to 20%, or even higher in some cases.

Typically, multilayer GMR resistors are sensitive to magnetic flux in both the in-plane standard axis, (e.g. in the X axis) and in the in-plane cross-axis (e.g. the Y axis). The standard axis is typically the axis extending along the length of the GMR strips that make up each GMR resistor. For some GMR resistors, the standard axis has about twice the sensitivity and five (5) times the hysteresis as compared to the cross axis, making operation in the cross axis more desirable for some applications. Minimizing the GMR resistor sensitivity along the standard axis can, for example, aid in minimizing any misalignment effect between a bias magnet and sensing bridge, and can also aid in minimizing misalignment effect between the sensor and a moving target.

FIG. 1 shows magnetic flux 160 emanating from a magnetic source 150. In the illustrative embodiment, the magnetic source 150 is located between the first pair $R_1$, $R_3$ and second pair $R_2$, $R_4$ of magnetoresistive resistors. A first flux concentrator 130 and a second flux concentrator 120 can be, for example, ferrous material regions formed of permalloy, for example. In the illustrative embodiment, the first flux concentrator 130 and second flux concentrator 120 can each be formed of a pair of ferrous material regions aligned generally parallel to the standard axis X and generally orthogonal to the cross axis Y.

The first flux concentrator 130 can act as a magnetic flux shunt causing the magnetic flux 160 to cross over the first pair of magnetoresistive resistors $R_1$, $R_3$ in a direction primarily parallel to the cross axis Y. Thus, magnetic flux 160 that crosses over the first pair of magnetoresistive resistors $R_1$, $R_3$ may have substantially no standard axis X component. Likewise, The second flux concentrator 120 can act as a magnetic flux shunt causing the magnetic flux 160 to cross over the second pair of magnetoresistive resistors $R_2$, $R_4$ in a direction primarily parallel to the cross axis Y. Thus, magnetic flux 160 that crosses over the second pair of magnetoresistive resistors $R_2$, $R_4$ may have substantially no standard axis X component. The flux concentrators 130, 120 can thus reduce the sensitivity of the GMR resistors in the standard axis by shunting the corresponding magnetic field component.

Figure 6:
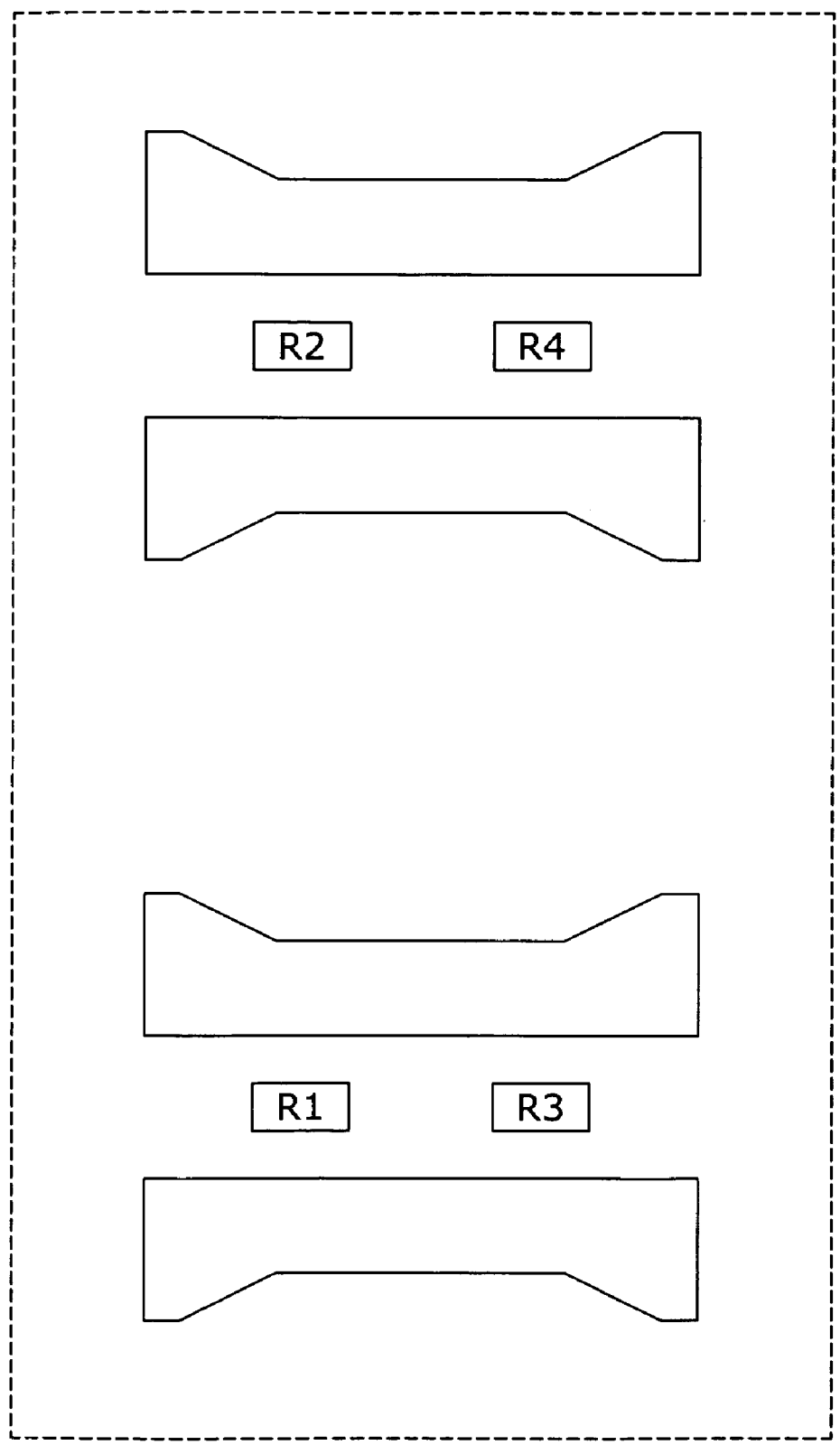
FIGS. 6 and 7 are schematic plan views showing a physical layout of other illustrative flux concentrator configurations.
Figure 7:
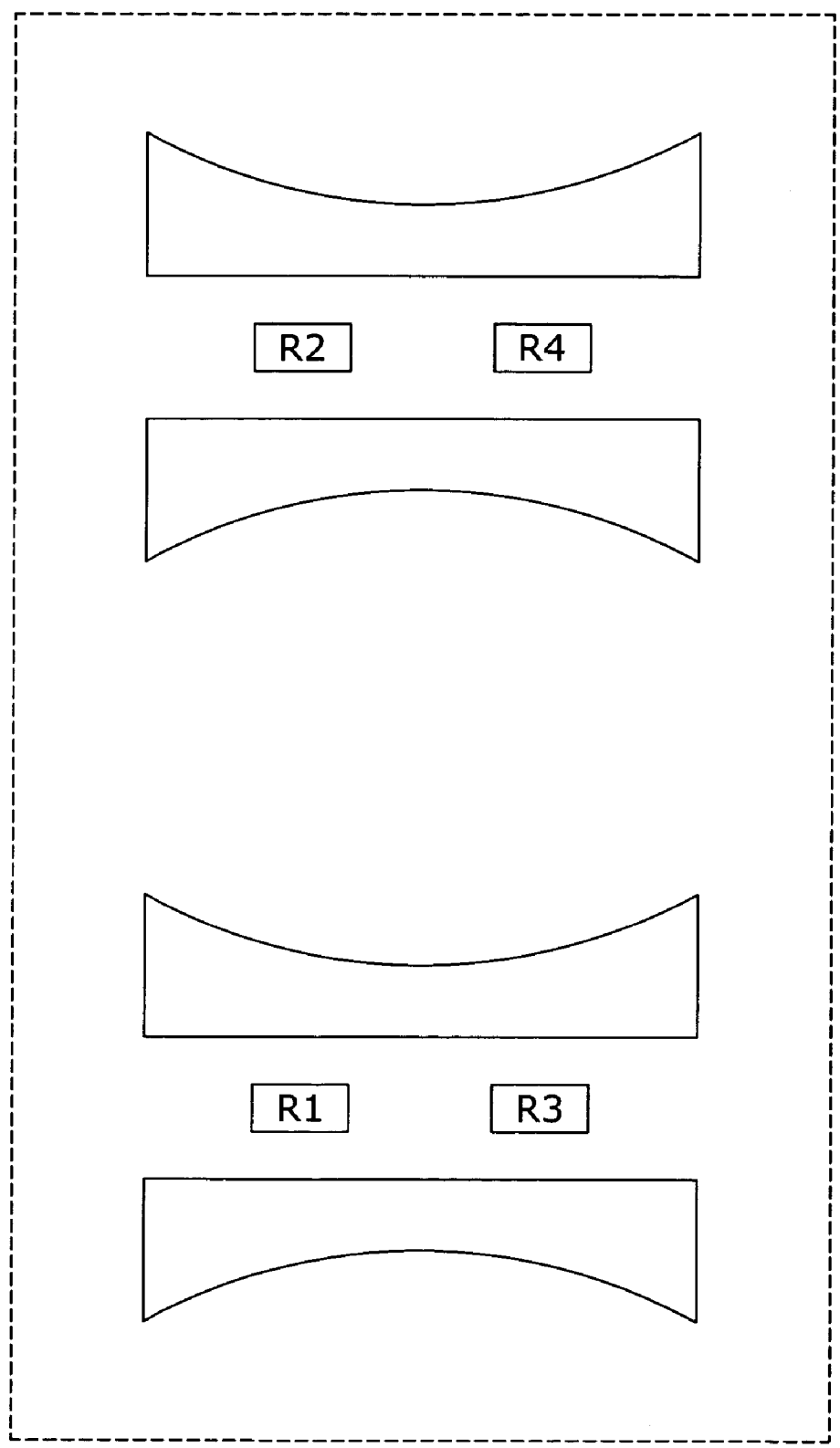

The first flux concentrator 130 is shown as a pair of rectangles having a relatively long length and a relatively short width. In the illustrative embodiment, the first flux concentrator 130 can have a length that extends along the X axis a distance sufficient to shunt magnetic flux across the entire surface of each of the first pair of magnetoresistive resistors $R_1$, $R_3$. In the illustrative embodiment, each rectangle has an inner face 132 proximate the first pair of magnetoresistive resistors $R_1$, $R_3$ and an opposing outer face 134. The inner face 132 can, for example, be planar and parallel to the standard axis X. The outer face 134 can be, for example, planar and parallel to the standard axis X. In one alternatively embodiment, the outer face 134 may be non-planar, if desired. For example, the outer face 134 can have a planar center portion, with outer portions set at an angle relative to the inner portions, such as shown in FIG. 6. In another embodiment, the outer face 134 can be curved, for example, the outer face 134 can be a convex shape facing away from the first pair of magnetoresistive resistors $R_1$, $R_3$, such as shown in FIG. 7. In some cases, the inner face 132 can be piecewise linear or curved, if desired.

The second flux concentrator 120 is also shown as a pair of rectangles having a relatively long length and a relatively short width. In the illustrative embodiment, the second flux concentrator 120 can have a length that extends along the X axis a distance sufficient to shunt magnetic flux across the entire surface of each of the second pair of magnetoresistive resistors $R_2$, $R_4$. In the illustrative embodiment, each rectangle has an inner face 122 proximate the second pair of magnetoresistive resistors $R_2$, $R_4$ and an opposing outer face 124. Like above, the inner face 122 can be, for example, planar and parallel to the standard axis X. The outer face 124 can be, for example, planar and parallel to the standard axis X. Alternatively, the outer face 124 can be non-planar, with outer portions set at an angle relative to the inner portion, such as shown in FIG. 6. Further, the outer face 124 can be curved, for example, the outer face 124 can be a convex shape facing away from the second pair of magnetoresistive resistors $R_2$, $R_4$, such as shown in FIG. 7. In some cases, the inner face 122 can be piecewise linear or curved, if desired.

In some embodiments, the flux concentrators 120 and 130 can be disposed on an insulating layer, and may be formed using a thin film deposition of ferrous material during the construction of the proximity sensor 100, if desired. They may also be formed by, for example, a plating operation using a thin film deposition to define the plated area. Alternatively, the flux concentrators 120 and 130 may be formed separately, and then affixed adjacent to the corresponding magnetoresistive resistor pairs. The ability to concentrate the flux along the desired path is partially a function of the thickness of the concentrators.

Figure 2:
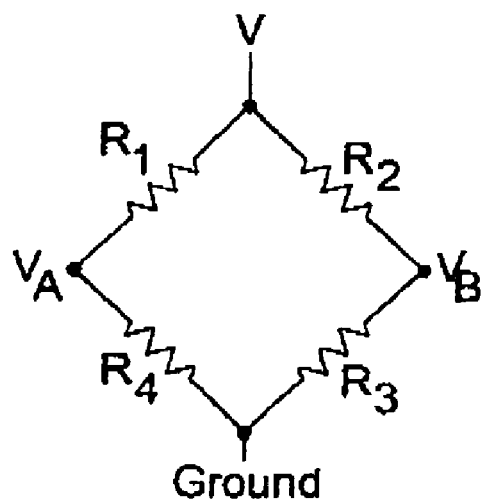
FIG. 2 is a schematic view of an equivalent electric layout of the proximity sensor of FIG. 1.

FIG. 2 is a schematic diagram of an equivalent electric layout of the proximity sensor 100 of FIG. 1. In the illustrative embodiment, the proximity sensor 100 is configured as a full Wheatstone bridge that includes four magnetoresistors $R_1$, $R_2$, $R_3$, and $R_4$. In some embodiments, only two of the resistors, such as resistors $R_1$ and $R_3$ may be magnetoresistive, while the other two resistors may be non-magnetoresistive resistors, if desired. A voltage can be applied across terminal $V_S$ and terminal Ground, and a differential output voltage is available between terminal $V_A$ and terminal $V_B$. In a half-bridge configuration, a single ended output voltage is provided.

Figure 3:
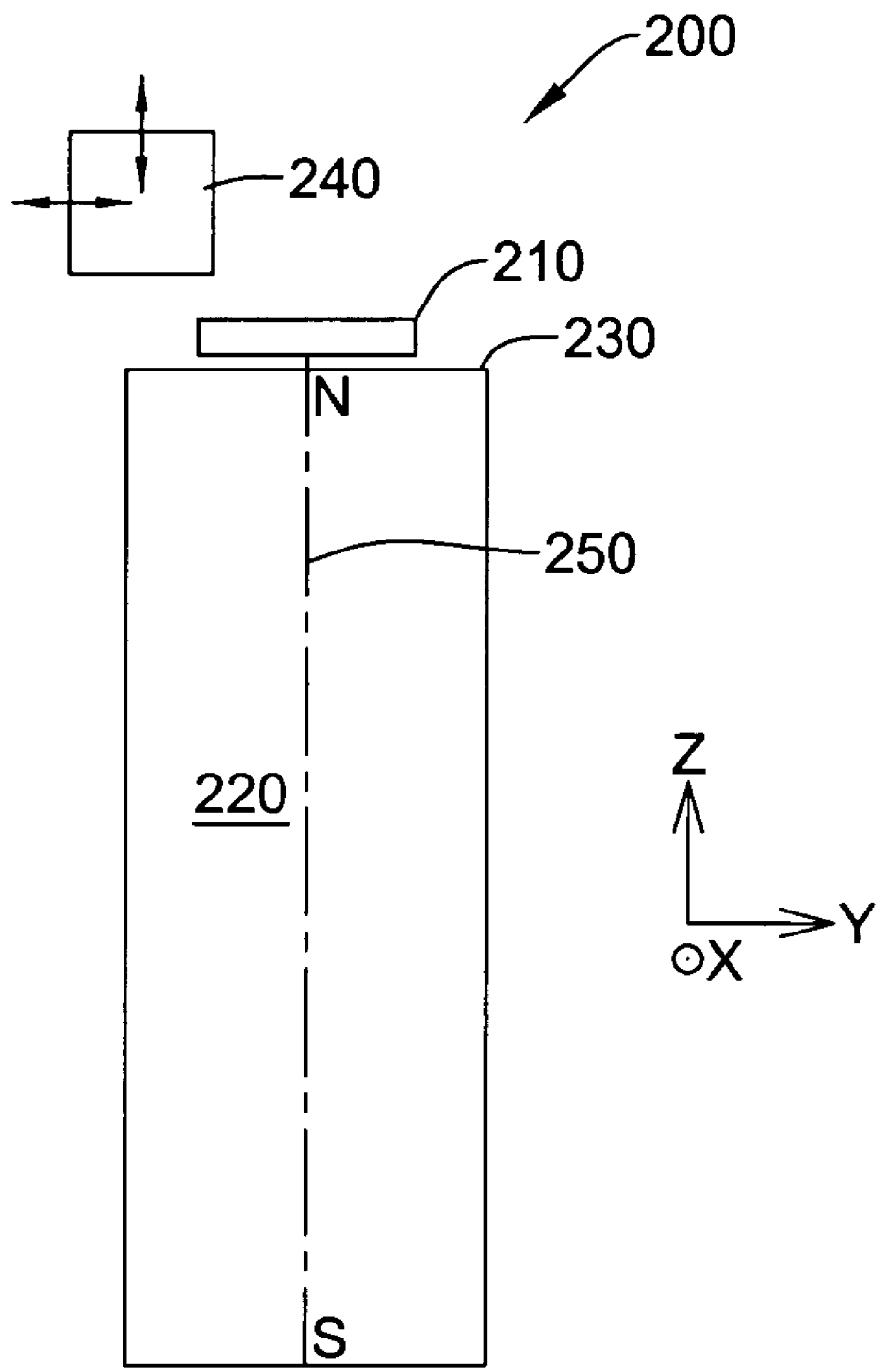
FIG. 3 is a schematic elevation view of an proximity transducer including a proximity sensor, a biasing magnetic source and a ferrous target.

FIG. 3 is a schematic elevation view of a proximity transducer 200 that includes a proximity sensor 210, a biasing magnetic source 220 and a ferrous target 240. In the illustrative embodiment, the proximity transducer 200 is used to detect the position of the ferrous target 240. The biasing magnetic source 220 may be a permanent magnet or the like, and may have an end 230 and an axis 250. The biasing magnetic source 220 produces a radial magnetic field component in a direction perpendicular to the axis 250 at the end 230.

The illustrative proximity sensor 210 may be similar to that described above with respect to FIGS. 1 and 2, and is shown positioned in a plane perpendicular to the axis 250 and parallel to the end 230 face of the magnetic field source 220, although this is not required in all embodiments. The biasing magnetic source 220 provides a bias magnetic field, which in some embodiments, can be centered or roughly centered about the bridge sensor such that the magnetic field experienced by the first pair of magnetoresistive resistors $R_1$, $R_3$ is equal or roughly equal to the magnetic field experienced by the second pair of magnetoresistive resistors $R_2$, $R_4$ when no ferrous target 240 is immediately present. The ferrous target 240 is configured to pass in the Y direction, and so that the proximity sensor 210 is disposed between the ferrous target 240 and the biasing magnetic source 220.

In the illustrative embodiment, the magnetoresistive sensing bridge is oriented so that the cross axis (e.g. Y axis) magnetic field excites the cross axis (e.g. Y axis) of the GMR resistors, which is orthogonal to the length of the multilayer strips that make up each of the GMR resistors. A similar field exists in the X axis and will excite the standard axis of the GMR resistors. The response of the GMR resistor is approximately equal to the sum of the response in the standard axis and the response in the cross axis. If the desired response is only found in the cross axis, the unwanted response in the standard axis may reduce the effective range of the GMR resistors by contributing to the eventual saturation of the GMR resistors. By using the flux concentrators 120 and 130, in conjunction with the GMR resistors, the magnetic field in the standard axis (e.g. X axis) may be redirected along the cross axis (e.g. Y axis), and thus the effective range and sensitivity of the GMR resistors may be increased. The flux concentrators 120 and 130 may also help minimize the effect of any misalignment between the biasing magnetic source 220 and the proximity sensor 210, and between the proximity sensor 210 and the ferrous target 240.

Figure 4:
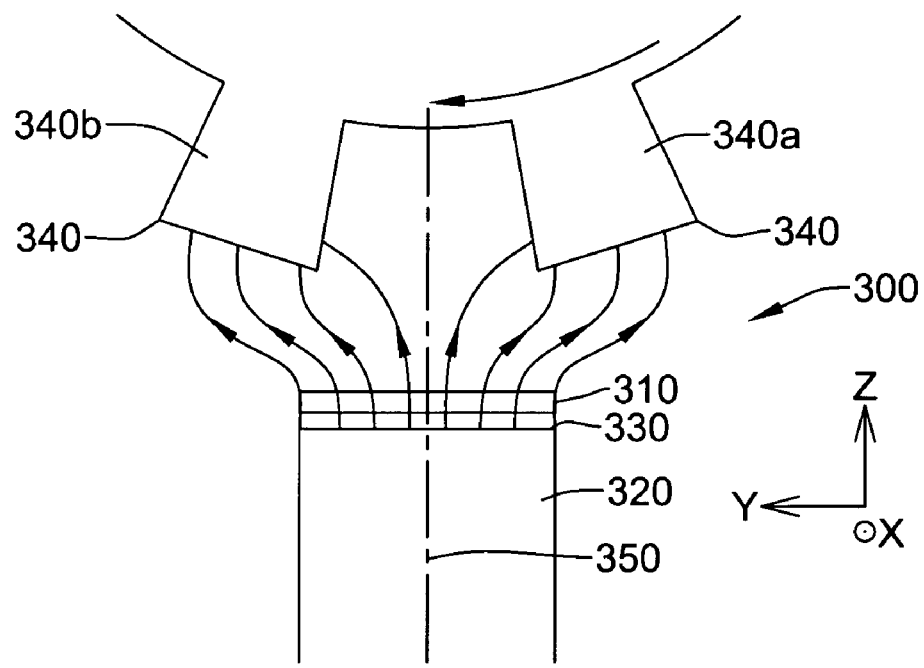
FIGS. 4 and 5 are schematic partial elevation views of the proximity transducer of FIG. 3 sensing gear teeth in various positions.
Figure 5:
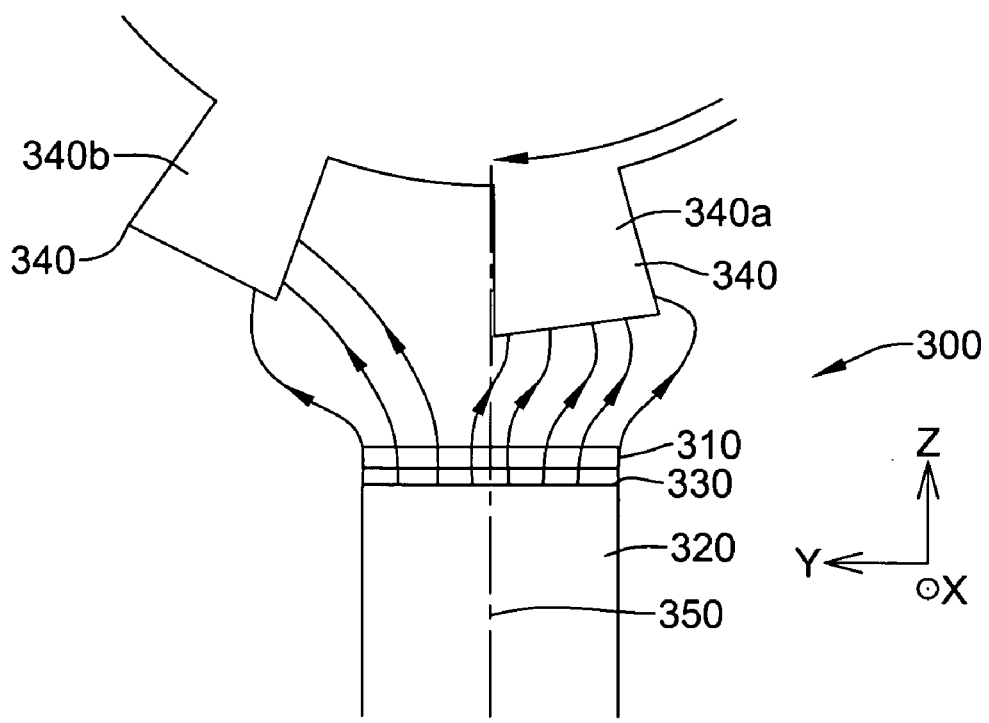

FIGS. 4 and 5 are schematic partial elevation views of the proximity transducer of FIG. 3, which is sensing a gear tooth in various positions. The proximity transducer 300 can include a proximity sensor 310 for detecting the position of the gear teeth 340. The proximity transducer 300 can also include a biasing magnetic source 320, such as a permanent magnet having an end 330 and an axis 350. The biasing magnetic source 320 can produce a radial magnetic field component in a direction perpendicular to the axis 350. The proximity sensor 310, which can include a GMR bridge as described above with respect to FIGS. 1 and 2, is disposed parallel to the end 330 of the biasing magnetic source 320, and is between the biasing magnetic source 320 and the gear teeth 340. In the illustrative embodiment, the gear teeth move across the proximity sensor 310 in the Y direction (see FIG. 1).

In FIG. 4, the centerline or axis 350 of the biasing magnetic source 320 is shown located at a mid-point between the two gear teeth 340a and 340b. In addition, the axis 350 runs through a center point 150 of the GMR bridge of the proximity sensor 310. In this configuration, the first pair of magnetoresistive resistors $R_1$, $R_3$ have a magnetic field in the −Y direction, which is equal and opposite to the magnetic field in the +Y direction that goes through the second pair of magnetoresistive resistors $R_2$, $R_4$. These bias fields cause the resistance of all four magnetoresistive resistors to decrease by a similar amount. With the magnetoresistive resistors $R_1$, $R_2$, $R_3$, and $R_4$ connected as shown in FIG. 2, the output voltage $V_A - V_B = 0$.

As the gear teeth 340 move in a clock-wise direction, and as best shown in FIG. 5, gear tooth 340a approaches the first pair of magnetoresistive resistors $R_1$ and $R_3$ from the right, and gear tooth 340b moves away from magnetoresistive resistors $R_2$ and $R_4$. Thus causes the resistance of magnetoresistors $R_1$ and $R_3$ to decrease further, and the resistance of magnetoresistors $R_2$ and $R_4$ to increase, which causes $V_A$ to increase and $V_B$ to decrease. Thus, $V_A - V_B$ goes positive. As the gear teeth 340 continue to move in a clockwise direction, all of the resistors are eventually again equally affected, and once again $V_A - V_B = 0$. As the gear tooth 340a approaches the second pair of magnetoresistive resistors $R_2$, $R_4$ from the right, it causes their resistance to decrease, making $V_A$ go negative and $V_B$ go positive, and $V_A - V_B$ go negative. Finally, as the gear tooth 340a moves further away from $R_2$, $R_4$, all resistors are again subject to the same bias field, and $V_A - V_B = 0$.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A proximity sensor for detecting the proximity of a moving target, comprising:
  a first magnetoresistive resistor;
  a second magnetoresistive resistor spaced from the first magnetoresistive resistor along a path of the moving target;
  a first flux concentrator positioned proximate the first magnetoresistive resistor; and
  a second flux concentrator positioned proximate the second magnetoresistive resistor;
  wherein, the first magnetoresistive resistor and the second magnetoresistive resistor are electrically coupled in a bridge configuration; wherein at least one of the first magnetoresistive resistor and the second magnetoresistive resistor is a giant magneto resistance resistor having an in-plane first axis direction and an orthogonal in-plane second axis direction; wherein the first flux concentrator redirects a magneric field component along the first axis direction through the first magnetoresistive resistor along the second axis direction.

2. The proximity sensor according to claim 1, wherein the first flux concentrator and second flux concentrator each include a pair of ferrous material regions.

3. The proximity sensor according to claim 1, wherein the first flux concentrator and second flux concentrator include a permalloy material.

4. The proximity sensor according to claim 2, wherein the first magnetoresistive resistor is disposed between the first flux concentrator pair of ferrous material regions.

5. The proximity sensor according to claim 4, wherein the second magnetoresistive resistor is disposed between the second flux concentrator pair of ferrous material regions.

6. The proximity sensor according to claim 1, wherein the second flux concentrator redirects a magnetic field component along she first axis direction through the second magnetoresistive resistor along the second axis direction.

7. The proximity sensor according to claim 1, wherein the first and second flux concentrators direct magnetic flux across the first and second magnetoresistive resistors along the second axis direction.

8. The proximity sensor according to claim 4, wherein the first flux concentrator pair of ferrous material regions each include an inner face proximate the first magnetoresistive resistor and an opposing outer face, wherein each inner face is planar or substantially planar and parallel to the first axis.

9. The proximity sensor according to claim 5, wherein the second flux concentrator pair of ferrous material regions each include an inner face proximate the second magnetoresistive resistor and an opposing outer face, wherein each inner face is planar or substantially planar and parallel to the first axis.

10. The proximity sensor according to claim 8, wherein at least a portion of the first flux concentrator pair of ferrous material regions opposing outer face is non-planar.

11. The proximity sensor according to claim 9, wherein at least a portion of the second flux concentrator pair of ferrous material regions opposing outer face is non-planar.

12. A proximity sensor comprising;
a first pair of magnetoresistive resistors;
a second pair of magnetoresistive resistors;
a first flux concentrator positioned proximate the first pair of magnetoresistive resistors; and
a second flux concentrator positioned proximate the second pair of magnetoresistive resistors;
wherein the first pair of magnetoresistive resistors and the second pair of magnetoresistive resistors are electrically coupled in a bridge configuration; wherein the first flux concentrator redirects a magnetic field component along a standard axis through the first pair of magnetoresistive resistors in a cross-axis direction.

13. The proximity sensor according to claim 12, wherein the first pair of magnetoresistive resistors and second pair of magnetoresistive resistors are giant magneto resistance resistors and each giant magneto resistance resistor has an in-plane standard axis direction and an orthogonal in-plane cross-axis direction.

14. The proximity sensor according to claim 13, wherein the first flux concentrator and second flux concentrator are each formed from a pair of ferrous material regions.

15. The proximity sensor according to claim 12, wherein the first flux concentrator and second flux concentrator are formed from petmalloy material.

16. The proximity sensor according to claim 14, wherein the first pair of magnetoresistive resistors is disposed between the first flux concentrator pair of ferrous material regions.

17. The proxinuty sensor according to claim 16, wherein the second pair of magnetoresistive resistors is disposed between the second flux concentrator pair of ferrous material regions.

18. The proximity sensor according to claim 12, wherein the second flux concentrator redirects a magnetic field component along the standard axis direction through the second pair of magnetoresistive resistors in the cross-axis direction.

19. The proximity sensor according to claim 12, wherein the first and second flux concentrators direct magnetic flux across the first and second pair of magnetoresistive resistors in the cross-axis direction.

20. The proximity sensor according to claim 14, wherein the first flux concentrator pair of ferrous material regions each include an inner face proximate the first pair of magnetoresistive resistors and an opposing outer face, wherein each inner face is planar and parallel to the standard axis.

21. The proximity sensor according to claim 20, wherein the second flux concentrator pair of ferrous material regions each include an inner face proximate the second pair of magnetoresistive resistors and an opposing outer face, wherein each inner face is planar and parallel to the standard axis.

22. The proximity sensor according to claim 20, wherein at least a portion of the first flux concentrator pair of ferrous material regions opposing outer face is non-planar.

23. The proximity sensor according to claim 21, wherein at least a portion of the second flux concentrator pair of ferrous material regions opposing outer face is non-planar.

24. A proximity transducer for detecting a position of a ferromagnetic target, comprising:
a magnetic field biasing source having an end and an axis, the magnetic field biasing source producing a radial magnetic field component in a direction perpendicular to the axis at the end; and a proximity sensor lying in a plane perpendicular or substantially perpendicular to the axis of the magnetic field biasing source and disposed between the end of the magnetic field biasing source and a ferromagnetic target, the proximity sensor comprising:
a first pair of magnetoresistive resistors;
a second pair of magnetoresistive resistors;
a first flux concentrator positioned proximate the first pair of magnetoresistive resistors; and
a second flux concentrator positioned proximate the second pair of magnetoresistive resistors;
wherein, the first pair of magnetoresistive resistors and the second pair of magnetoresistive resistors are electrically coupled in a bridge configuration; wherein the first and second flux concentrators are configured to redirect magnetic flux across the first and second pair of magnetoresistive resistors in a cross-axis direction.

25. The proximity transducer according to claim 24, wherein the first pair of magnetoresistive resistors and second pair of magnetoresistive resistors are giant magneto resistance resistors, and each giant magneto resistance resistor has an in-plane standard axis direction and an orthogonal in-plane cross-axis direction.

26. The proximity transducer according to claim 25, wherein the first flux concentrator and second flux concentrator are each formed from a pair of ferrous material regions.

27. The proximity transducer according to claim 26, wherein the first flux concentrator and second flux concentrator are formed from permalloy material.

28. The proximity transducer according to claim 26, wherein the first pair of magnetoresistive resistors is disposed between the first flux concentrator pair of ferrous material regions.

29. The proximity transducer according to claim 28, wherein the second pair of magnetoresistive resistors is disposed between the second flux concentrator pair of ferrous material regions.

30. The proximity transducer according to claim 29, wherein the first flux concentrator redirects a magnetic field component of the magnetic field biasing source that extends along the standard axis tough the first pair of magnetoresistive resistors in the cross-axis direction.

31. The proximity transducer according to claim 30, wherein the second flux concentrator redirects a magnetic field component of the magnetic field biasing, source that extends along the standard axis though the second pair of magnetoresistive resistors in the cross-axis direction.

32. The proximity transducer according to claim 31, wherein the ferromagnetic target is a gear tooth.

33. The proximity transducer according to claim 32, wherein the ferromagnetic target is configured for movement in a direction parallel to the cross-axis direction.

34. The proximity transducer according to claim 33, wherein the first flux concentrator pair of ferrous material regions each include an inner face proximate the first pair of magnetoresistive resistors and an opposing outer face, wherein the each inner face is planar and parallel to the standard axis.

35. The proximity transducer according to claim 34, wherein the second flux concentrator pair of ferrous material regions each include an inner face proximate the second pair of magnetoresistive resistors and an opposing outer face, wherein the each inner face is planar and parallel to the standard axis.

36. The proximity transducer according to claim 35, wherein at least a portion of the first flux concentrator pair of ferrous material regions opposing outer face is non-planar.

37. The proximity transducer according to claim 36, wherein at least a portion of the second flux concentrator pair of ferrous material.

38. A proximity sensor comprising:
a first magnetoresistive resistor;
a second magnetoresistive resistor spaced from the first magnetoresistive resistor, wherein at least one of the first magnetoresistive resistor and the second magnetoresistive resistor is a giant magneto resistance resistor having an in-plane first axis direction and an orthogonal in-plane second axis direction;
a first flux concentrator positioned proximate the first magnetoresistive resistor;
a second flux concentrator positioned proximate the second magnetoresistive resistor;
wherein, the first magnetoresistive resistor sad the second magnetoresistive resistor are electrically coupled in a bridge configuration; and
wherein the first flux concentrator redirects a magnetic field component along the first axis direction through the first magnetoresistive resistor along the second axis direction.

39. The proximity sensor according to claim 38, wherein the second flux concentrator redirects a magnetic field component along the first axis direction through the second magnetoresistive resistor along the second axis direction.

40. A proximity sensor for detecting the proximity of a moving target, comprising:
a first magnetoresistive resistor;
a second magnetoresistive resistor spaced from the first magnetoresistive resistor along a path of the moving target;
a first flux concentrator positioned proximate the first magnetoresistive resistor; and
a second flux concentrator positioned proximate the second magnetoresistive resistor;
the first flux concentrator and second flux concentrator each include a pair of ferrous material regions;
the first magnetoresistive resistor and the second magnetoresistive resistor are electrically coupled in a bridge configuration, wherein at least one of the first magnetoresistive resistor and the second magnetoresistive resistor is a giant magneto resistance resistor having an in-plane first axis direction and an orthogonal in-plane second axis direction; the first magnetoresistive resistor is disposed between the first flux concentrator pair of ferrous material regions; and
the first flux concentrator pair of ferrous material regions each include an inner face proximate the first magnetoresistive resistor and an opposing outer face, wherein each inner face is planar or substantially planar and parallel to the first axis, and wherein at least a portion of the first flux concentrator pair of ferrous material regions opposing outer face is non-planar.

41. A proximity sensor comprising:
a first pair of magnetoresistive resistors;
a second pair of magnetoresistive resistors;
a first flux concentrator positioned proximate the first pair of magnetoresistive resistors;
a second flux concentrator positioned proximate the second pair of magnetoresistive resistors;
wherein the first pair of magnetoresistive resistors and the second pair of magnetoresistive resistors are electrically coupled in a bridge configuration; and
wherein the first and second flux concentrators direct magnetic flux across the first and second pair of magnetoresistive resistors in the cross-axis direction.

42. A proxinuty sensor comprising:
a first pair of magnetoresistive resistors;
a second pair of magnetoresistive resistors;
the first pair of magnetoresistive resistors and the second pair of magnetoresistive resistors are electrically coupled in a bridge configuration;
the first pair of magnetoresistive resistors and second pair of magnetoresistive resistors are giant magneto resistance resistors and each giant magneto resistance resistor has an in-plane standard axis direction and an orthogonal in-plane cross-axis direction;
a first flux concentrator positioned proximate the first pair of magnetoresistive resistors;
a second flux concentrator positioned proximate the second pair of magnetoresistive resistors;
wherein the first flux concentrator and second flux concentrator are each fanned from a pair of ferrous material regions; and the flint flux concentrator pair of ferrous material regions each include an inner face proximate the first pair of magnetoresistive resistors and an opposing outer face, wherein each inner face is planar and parallel to the standard axis, and at least a portion of the first flux concentrator pair of ferrous material regions opposing outer face is non-planar.

43. A proximity transducer for detecting a position of a ferromagnetic target, comprising:

a magnetic field biasing source having an end and an axis, the magnetic field biasing source producing a radial magnetic field component in a direction perpendicular to the axis at the end; and a proximity sensor lying in a plane perpendicular or substantially perpendicular to the axis of the magnetic field biasing source and disposed between the end of the magnetic field biasing source and a ferromagnetic target, the proximity sensor comprising:

a first pair of magnetoresistive resistors;

a second pair of magnetoresistive resistors, wherein the first pair of magnetoresistive resistors and the second pair of magnetoresistive resistors are electrically coupled in a bridge configuration;

the first pair of magnetoresistive resistors and second pair of magnetoresistive resistors are giant magneto resistance resistors, and each giant magneto resistance resistor has an in-plane standard axis direction and an orthogonal in-plane cross-axis direction;

a first flux concentrator positioned proximate the first pair of magnetoresistive resistors; and a second flux concentrator positioned proximate the second pair of magnetoresistive resistors;

the first flux concentrator and second flux concentrator each formed from a pair of ferrous material regions, with the first pair of magnetoresistive resistors disposed between the first flux concentrator pair of ferrous material regions and the second pair of magnetoresistive resistors disposed between the second flux concentrator pair of ferrous material regions; and wherein the first flux concentrator redirects a magnetic field component of the magnetic field biasing source that extends along the standard axis though the first pair of magnetoresistive resistors in the cross-axis direction.

* * * * *